United States Patent
Okada et al.

[11] Patent Number: 5,806,231
[45] Date of Patent: Sep. 15, 1998

[54] PASS-THROUGH FISHING ROD

[75] Inventors: Muneki Okada; Tokuda Isamu, both of Osaka, Japan

[73] Assignee: Shimano, Inc., Osaka, Japan

[21] Appl. No.: 976,377

[22] Filed: Nov. 21, 1997

Related U.S. Application Data

[63] Continuation of Ser. No. 592,261, Jan. 26, 1996, abandoned.

[30] Foreign Application Priority Data

Jan. 31, 1995 [JP] Japan ................................. 7-014261

[51] Int. Cl.⁶ .................................................. A01K 87/00
[52] U.S. Cl. ................................................ 43/24; 43/18.1
[58] Field of Search ...................... 43/18.1, 18.5, 43/24

[56] References Cited

U.S. PATENT DOCUMENTS

| | | | |
|---|---|---|---|
| 2,777,239 | 1/1957 | Cushman | 43/18 |
| 3,862,509 | 1/1975 | Petersen, Jr. | 43/18.1 |
| 5,188,152 | 2/1993 | Ogawa | 43/18.5 |
| 5,328,742 | 7/1994 | Tukihara | 43/18.1 |
| 5,488,797 | 2/1996 | Akiba | 43/18.1 |

FOREIGN PATENT DOCUMENTS

| | | | |
|---|---|---|---|
| 249360 | 8/1963 | Australia | 43/24 |
| 73380 | 6/1960 | France | 43/18.1 |
| 1-304836 | 12/1989 | Japan . | |
| 4-341133 | 11/1992 | Japan | 43/24 |
| 5-219864 | 8/1993 | Japan | 43/18.1 |
| 5-276853 | 10/1993 | Japan | 43/18.1 |
| 5-88259 | 12/1993 | Japan . | |

*Primary Examiner*—Robert P. Swiatek
*Attorney, Agent, or Firm*—Jeffer, Mangels, Butler & Marmaro LLP

[57] ABSTRACT

A pass-through fishing rod includes a tip section and a butt section. The tip section has an internal fishing line passage with an inside wall surface, and comprises a convex portion for supporting a fishing line formed on the inside wall surface of at least the tip-end portion of the fishing line passage. The butt section has an internal fishing line passage with a smooth inside wall surface, and is formed from a fiber-reinforced resin comprising reinforcing fibers that are aligned in the circumferential direction.

19 Claims, 5 Drawing Sheets

PASS-THROUGH FISHING ROD

This application is a continuation of application Ser. No. 08/592,261, filed Jan. 26, 1996, and now abandoned.

FIELD OF THE INVENTION

The present invention concerns a pass-through fishing rod in which the fishing line is passed through the interior of the rod body.

BACKGROUND OF THE INVENTION

In pass-through fishing rods, the fishing line passes through a fishing line passage formed inside the rod body when said fishing line is fed out or taken up. In this case, the fishing line contacts the inside surface of the fishing line passage, and is therefore subjected to rubbing resistance. In cases where this rubbing resistance is large, the fishing line cannot be smoothly fed out or taken up.

Techniques for reducing such rubbing resistance include the technique disclosed in Japanese Utility Model Application Kokai No. 5-88259. In this technique, a resin tape is wrapped around the mandrel used to manufacture the rod body from a fiber-reinforced resin, and a prepreg is wrapped around on top of this tape and hardened. Then, a helical band-form concave portion and convex portion are formed on the inside surface of the manufactured rod body by removing the aforementioned resin tape from said inside surface. The convex portion of the aforementioned helical band-form concave portion and convex portion is utilized as a supporting element for the fishing line.

In the case of the aforementioned pass-through fishing rod in which a concave portion and convex portion are formed on the inside surface of the rod body, the rubbing resistance applied to the fishing line is reduced, so that the fishing line can be fed out smoothly. However, the overall thickness of the rod body is increased as a result of the formation of the aforementioned concave portion and convex portion. Accordingly, in the case of shake-out rods and standard-joint rods, the thickness of the steps of the respective joint elements is increased, so that the bending of the rod becomes discontinuous when a load is applied to the tip of the rod.

Furthermore, especially in the case of shake-out rods, the end surface on the base end of the tip section strikes against the convex portions on the inside surface of the butt section when the tip section is accommodated inside said butt section, so that a rattling sound is generated during said accommodation process. Furthermore, in cases where the end surface of the tip section repeatedly strikes the aforementioned convex portions, cracking may occur from said end surface.

The object of the present invention is to achieve a sufficient reduction in the contact resistance acting on the fishing line, and also to eliminate any noise occurring during the accommodation of the tip section and prevent any damage to the end surface of said tip section.

SUMMARY OF THE PREFERRED EMBODIMENTS

In accordance with one aspect of the present invention, there is provided an improved pass-through fishing rod. The inventive pass-through fishing rod has a plurality of joint elements, and more specifically has a tip section and a butt section. The tip section has a tip-end portion, and possesses an internal fishing line passage with an inside wall surface. The tip section includes a convex portion used to support the fishing line on at least the tip-end portion of the inside wall surface of said fishing line passage. The butt section is formed from a fiber-reinforced resin in which the reinforcing fibers are aligned in the circumferential direction, and has an internal fishing line passage whose inside wall surface is smooth.

The inventive pass-through rod as a whole can be made slender as in the case of a conventional pass-through fishing rod which has no convex portion as a supporting element. There is no particular need to increase the thickness of the steps of the joint elements. Accordingly, discontinuity of the bending of the fishing rod can be prevented. Furthermore, in addition to the fact that no supporting element is formed on the inside wall surface of the butt section, the reinforcing fibers of said butt section are aligned in the circumferential direction, so that said inside wall surface is hard and not easily scratched. Thus, when the tip section is accommodated inside the larger diameter rod section, the end surface at the base end of the tip section enters the larger diameter rod section smoothly, so that noise and damage to said end surface can be avoided during said accommodation.

According to a preferred embodiment, the convex portion of the aforementioned tip section is formed in a helical shape. Accordingly, said supporting element can easily be formed.

According to a second preferred embodiment, the aforementioned convex portion is trapezoidal in cross section, and has arc-form portions located at the upper corners of said trapezoidal cross-section. As a result, the rubbing resistance acting on the fishing line is reduced.

According to a third preferred embodiment, the aforementioned convex portion has arc-form portions located at the lower corner parts of the aforementioned trapezoidal cross-section.

A large stress is generated in the lower corner parts of the trapezoidal cross-section of the supporting element when a contact resistance force is applied to said supporting element by the fishing line. However, since arc-form portions are formed on these lower corner parts where such a large stress is generated, the concentration of stress is relieved so that the mechanical strength of the convex portion is increased and the durability of said portion is improved.

According to a fourth preferred embodiment, the width of the lower side of the trapezoidal cross-section of the aforementioned convex portion is 0.6 to 1.2 mm. This ensures an appropriate area for the connecting portion between the convex portion and the rod body so that the strength and durability of the convex portion are improved. If the width of the aforementioned lower side is too narrow, the strength and durability of the supporting element will drop. Conversely, if the width of said lower side is too great, the width of the upper side of the trapezoidal cross-sectional shape will also be increased so that the contact resistance acting on the fishing line is increased, thus making it difficult to feed out or take up the fishing line.

According to a fifth preferred embodiment, the height of the trapezoidal cross-section of the aforementioned convex portion is 0.2 to 0.6 mm. This ensures that an appropriate distance from the inside surface of the fishing line passage formed in rod body is maintained so that the fishing line can be supported in a favorable manner. If the supporting element is too high, the internal space of the fishing line passage will be narrowed so that it is difficult for the fishing line to pass through. Furthermore, in the case of a shake-out rod, the rod body of each stage accommodates the rod body located immediately forward of said stage. Accordingly, if the aforementioned internal space is narrow, the accommodation of the rod bodies of the various stages will be hindered. On the other hand, in cases where the convex portion is too low, moisture may accumulate between the fishing line and the inside surface of the fishing line passage (in the areas between the turns of the convex portion) when a wet fishing line passes through, thus creating a force which resists the movement of the fishing line, so that it becomes difficult to feed out or take up the fishing line. Furthermore, even if the fishing line is not wet, the fishing line may contact the inside surface of the fishing line passage so that the resistance force acting on the fishing line is increased.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
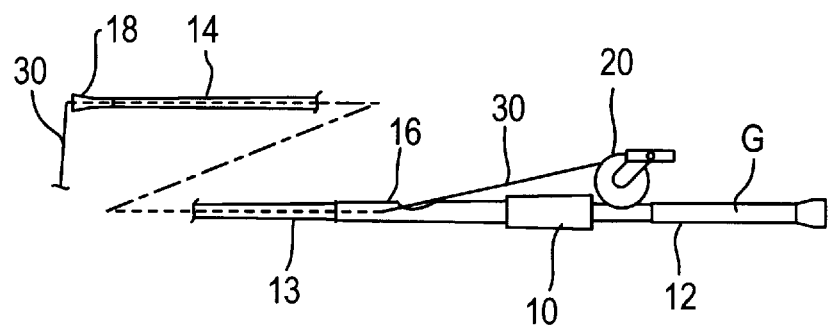
FIG. 1 is a front view of a pass-through fishing rod which illustrates one embodiment of the present invention.
Figure 6:
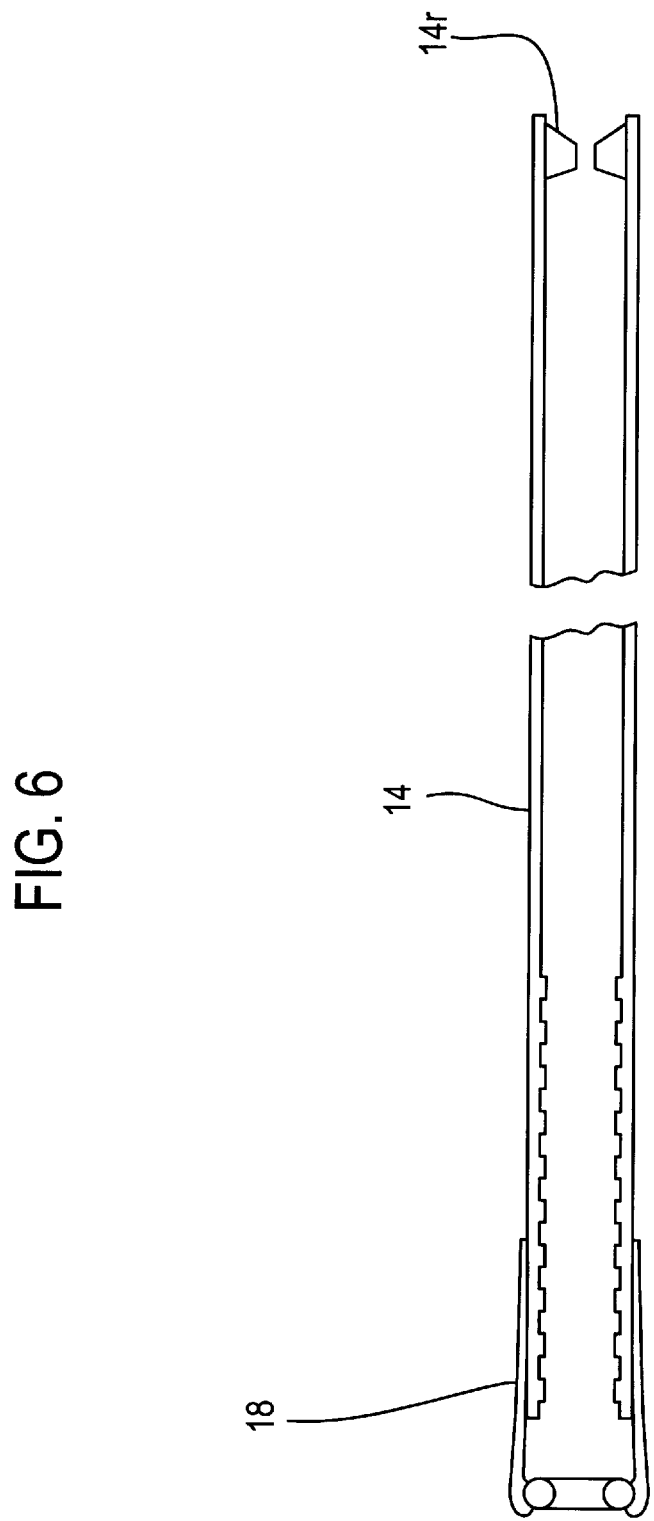
FIG. 6 is a magnified sectional view of a preferred embodiment of a tip section of the invention, showing the placement of an inner ring.
Figure 7:
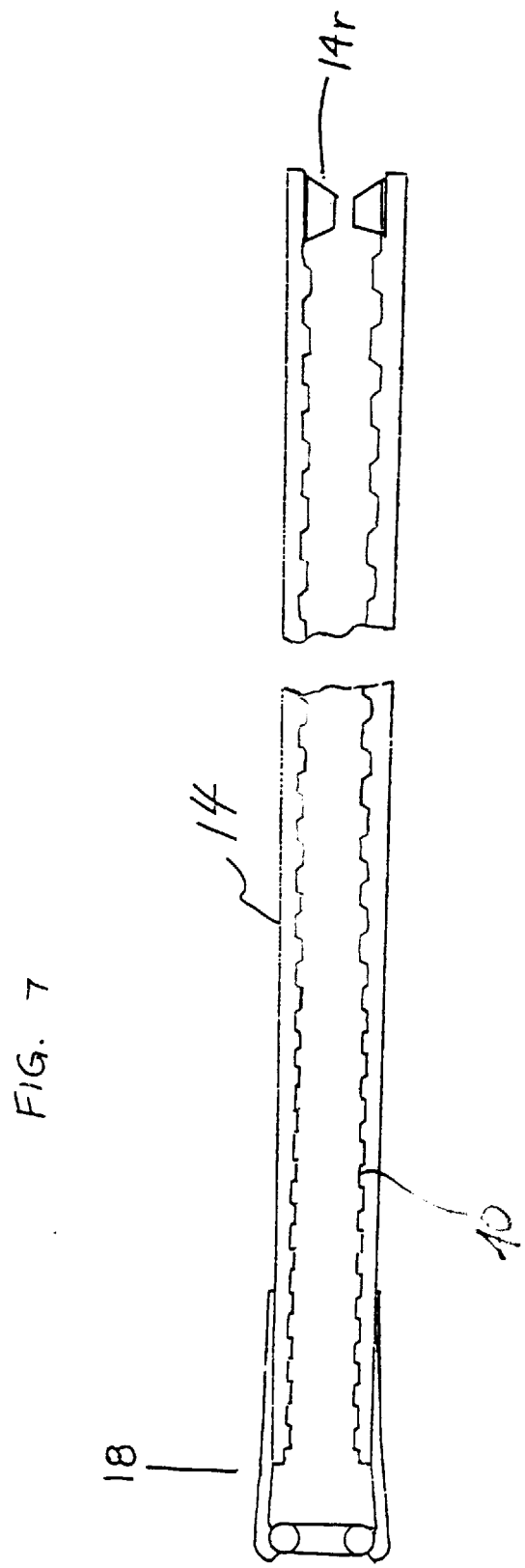
FIG. 7 is a magnified sectional view of an alternative embodiment of a tip section of the invention, showing the convex portion formed on the inside wall of substantially the entire length of the fishing line passage of the tip section.

With reference now to FIG. 1, pass-through fishing rod (10) is a shake-out fishing rod. Rod (10) has a base rod (12) with a grip (G), an intermediate rod (13) which is connected to the tip end of the base rod (12), and a tip section (14) which is connected to the tip end of the intermediate rod (13). Preferably, tip section (14) has an inner ring (14r) at its base end, as shown in FIG. 6.

A reel (20) around which a fishing line (30) is wound is mounted in the vicinity of the grip (G) of the base rod (12). The base rod (12), intermediate rod (13) and tip section (14) are respectively formed as gradual circular cones, and an introduction port (16) for the fishing line (30) is formed in the tip portion of the base rod (12). Furthermore, a tubular fishing line guide element (18) is mounted on the tip of the tip section (14). The fishing line (30) pulled out from the reel (20) enters the fishing rod (10) via the introduction port (16), and is pulled out from the fishing line guide element (18).

Figure 2:
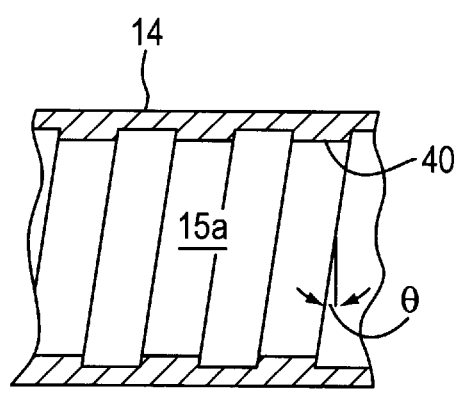
FIG. 2 is a magnified sectional view of the tip section.
Figure 3:
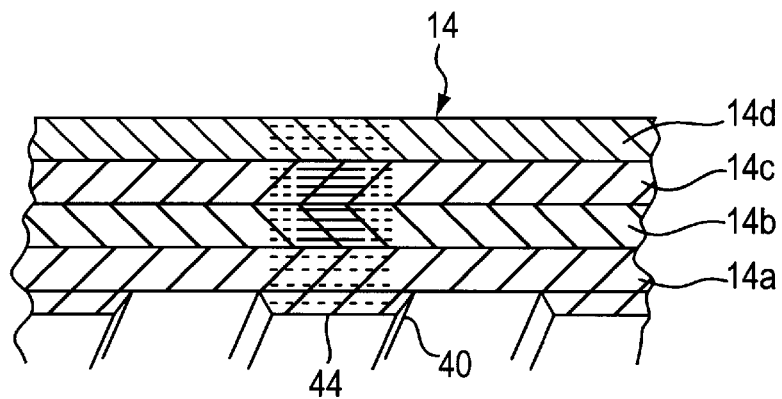
FIG. 3 is a partial magnified sectional view of the tip section.

As is shown in FIG. 2, the tip section (14) has an internal fishing line passage (15a). A helical convex portion (40) is formed as a supporting element on the inside surface of this fishing line passage (15a), and is an integral part of the tip section (14). As is shown in a magnified view in FIG. 3, the tip section (14) has a first layer (14a) on which the aforementioned convex portion (40) is formed, and a second layer (14b), third layer (14c) and fourth layer (14d) which are successively laminated on the outer circumference of said first layer (14a). The convex portion (40) and respective layers (14a) through (14d) are formed from a prepreg in which a plurality of reinforcing fibers (44) are embedded. Furthermore, in the supporting element (40), first layer (14a) and fourth layer (14d), said reinforcing fibers are aligned in the circumferential direction, while in the second layer (14b) and third layer (14c), said reinforcing fibers are aligned in the axial direction. Other combinations of reinforcing fiber alignments can also be used if desired. Furthermore, the reinforcing fibers (44) in the supporting element (40) consists of twisted fibers, in this case, fibers known as "Tyrrano fibers" (SIC fibers) are used. These Tyrrano fibers consist mainly of Si, C and O, and also contain Ti, B and N. These fibers have a fiber diameter of 8.5 microns, and are used at a twist of 0.8K ×4 (160-turn twist). Furthermore, carbon fibers, etc., are used for the reinforcing fibers in the other layers (14a) through (14d).

Figure 5:
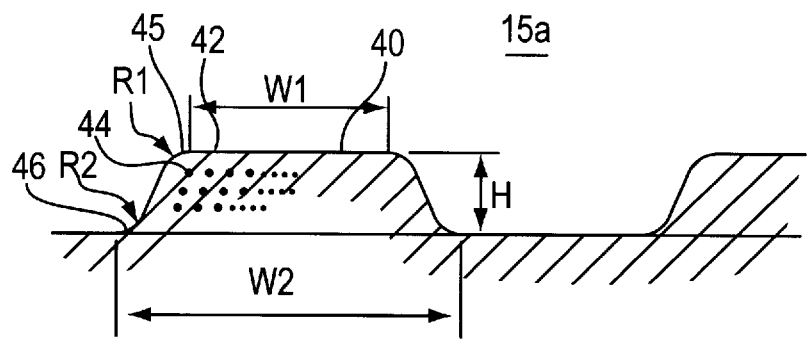
FIG. 5 is a magnified sectional view of the supporting part.

As is shown in an even more highly magnified view in FIG. 5, the aforementioned convex portion (40) is trapezoidal in cross-section, with the wider lower side of said trapezoidal cross-section being connected to the inside surface of the fishing line passage (15a), and the narrower upper side or said trapezoidal cross-section protruding toward the center of the fishing line passage (15a). Arc-form portions (45) are formed on the upper corner parts of the convex portion (40), and arc-form portions (46) are also formed on the lower corner parts of the convex portion (40).

The term "arc-form" as used herein denotes a shape having a cross-section which is a smooth curve, such as a portion of a circle, ellipse or oval. Preferably, the arc-form portion is a portion of a circle.

The width W2 of the lower side of the convex portion (40) is set at 0.6 to 1.2 mm. Since the convex portion (40) is trapezoidal in cross-section, the width W1 of the upper side is slightly smaller than the width W2 of the lower side. The height H of the convex portion is set at 0.2 to 0.6 mm. As was described above, the convex portion (40) is formed in a helical configuration. The lead angle $\theta$ of this helix (see FIG. 1) is set at 50° or less. The radius R1 of the arc-form portions (45) of the upper corner parts is a circular-arc radius of 0.05 to 2 mm, and the radius R2 of the arc-form portions (46) of the lower corner parts is also a circular-arc radius of 0.05 to 2 mm.

A manufacturing technique disclosed in the aforementioned Japanese Utility Model Application Kokai No. 5-88259 can be used in order to form a convex portion (40) with the abovementioned structure in the tip section (14). In this manufacturing process, the structure of the aforementioned convex portion (40) is formed by adjusting the conditions of the resin tape (width, thickness, wrapping lead angle, etc.) that is wrapped around the mandrel used to manufacture the tip section (14), as well as the characteristics of the prepreg, and the characteristics of the synthetic resin and reinforcing fibers constituting said prepreg, etc.

Figure 4:
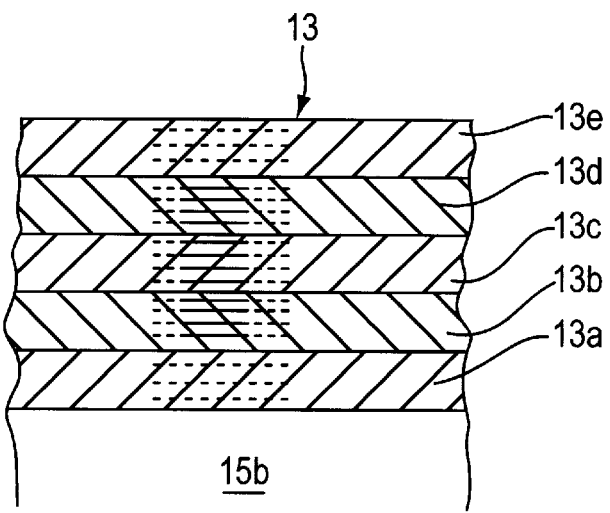
FIG. 4 is a partial magnified sectional view of the intermediate rod.

As is shown in a magnified view in FIG. 4, the intermediate rod (13) consists of five layers. Furthermore, the basic structure of the base rod (12) is also the same as the structure shown in FIG. 4.

Like the aforementioned tip section (14), this intermediate rod (13) also has an internal fishing line passage (15b). The wall surface of the innermost first layer (13a), i.e., the wall surface of the fishing line passage (15b), is smooth, with no convex portion being formed on said wall surface. A second layer (13b), third layer (13c), fourth layer (13d) and fifth layer (13e) are successively laminated on the outer circumference of the aforementioned first layer (13a). The respective layers (13a) through (13e) are formed from a prepreg in which numerous reinforcing fibers are embedded. In the first layer (13a) and fifth layer (13e), the reinforcing fibers are aligned in the circumferential direction, while in the second layer (13b), third layer (13c) and fourth layer (13d), the reinforcing fibers (44) are aligned in the axial direction. Again, other combinations of reinforcing fiber orientation can also be used.

Next, the method used to manufacture the tip section (14) will be briefly described.

First, a mold release agent consisting of a wax, etc., is applied to the outer circumference of the mandrel, and a mold release tape consisting of a polypropylene resin is wound tightly around the mandrel on top of the aforementioned mold release agent. Next, prepregs which are used to form the convex portion (40) and the aforementioned first through fourth layers are wrapped around the circumference of the mold release tape. Furthermore, as was described above, the convex portion (40) is formed by wrapping a tape-form prepreg (obtained by impregnating a resin with Tyrrano fibers) with the individual turns of said prepreg spaced at a prescribed pitch. Moreover, the four prepreg layers (14a) through (14d) are formed by tightly wrapping prepreg tapes obtained by impregnating a resin with carbon fibers.

The convex portion (40) and the innermost prepreg layer (14a) are formed by wrapping prepreg tapes in which the reinforcing fibers are aligned in the direction of length of the tape. Accordingly, the reinforcing fibers in the convex portion (40) and prepreg layer (14a) are aligned in the circumferential direction of the mandrel. Furthermore, the second and third prepreg layers (14b) and (14c) are manufactured either by wrapping prepreg tapes in which the reinforcing fibers are aligned in the direction of width of the tape, or by wrapping prepreg sheets in which the reinforcing fibers are aligned in the direction of length of the sheet around the mandrel so that the direction of length of each of said sheets is oriented in the direction of width of the mandrel. As a result, the reinforcing fibers in the second and third prepreg layers (14b) and (14c) are aligned in the axial direction.

The fourth prepreg layer (14d) is manufactured in the same manner as the first prepreg layer (14a). Accordingly, the reinforcing fibers are aligned in the circumferential direction.

After the prepreg forming the convex portion (40) and the four prepreg layers (14a) through (14d) have thus been installed, a shape-retaining tape (not shown in the figures) consisting of polyethylene terephthalate (PET) or polypropylene, etc., is wrapped around the outer circumference, and hardening is performed using an ordinary method. Any of a variety of hardening means, such as exposing the layers to ultraviolet light, heating the material or adding a hardening agent, can be used. After hardening, the shape-retaining tape on the outer circumference is stripped away and the mold release tape on the inner circumference is removed, thus producing a tip section (14) such as that shown in FIG. 3.

Here, a fishing line passage (15a) which is circular in cross section is formed inside the tip section (14), and a helical convex portion (40) which is trapezoidal in cross-section is formed on the inside circumferential surface of said fishing line passage (15a).

In a pass-through fishing rod constructed in this manner, since the aforementioned convex portion (40) is formed inside the small-diameter tip section (14) where the rubbing resistance tends to increase due to the adhesion of water, etc., said rubbing resistance can be prevented from increasing even in the case of long-term use.

Furthermore, the inside wall surfaces of the intermediate rod (13) and base rod (12) are formed as smooth surfaces, with no convex portions. Accordingly, when the tip section (14) is accommodated inside the intermediate rod (13), and when the intermediate rod (13) is accommodated inside the base rod (12), any parts that might be struck by the respective end parts on the base ends of the tip section (14) and intermediate rod (13) are eliminated, so that noise and damage to said end parts can be prevented during said accommodation. Furthermore, in the layers which form the inside wall surfaces of the intermediate rod (13) and base rod (12), the reinforcing fibers are aligned in the circumferential direction. As a result, these inside wall surfaces are relatively hard, so that damage to the inside wall surfaces themselves is reduced. Accordingly, catching of the rod end parts on the inside wall surfaces can be more effectively prevented.

In addition to the shake-out fishing rod illustrated in the figures, the present invention can also be applied to standard-joint type fishing rods.

The convex portion (40) formed in the fishing line passage (15a) of the tip section (14) could also be formed only in the tip portion of said fishing line passage (15a), rather than throughout the entire tip section (14).

In the embodiment described above, the convex portion (40) was formed by means of a prepreg containing a Tyrrano resin. However, it would also be possible to form this convex portion (40) using a prepreg containing carbon fibers similar to the prepreg used for the prepreg layer (14a).

What is claimed is:

1. A pass-through fishing rod comprising:
   (a) a tip section having a tip-end portion, said tip section having an internal fishing line passage with an inside wall surface,
   said tip section comprising a convex portion for supporting a fishing line formed on said inside wall surface of at least said tip-end portion of said fishing line passage,
   wherein said convex portion is formed from a wrapped prepreg in which a plurality of reinforcing fibers are embedded, and
   (b) a butt section having an internal fishing line passage with a smooth inside wall surface, said butt section being formed from a fiber-reinforced resin comprising reinforcing fibers that are aligned in the circumferential direction.

2. The pass-through fishing rod of claim 1 wherein said convex portion is formed in a helical shape.

3. The pass-through fishing rod of claim 1 wherein said convex portion has a trapezoidal cross section, said trapezoidal cross-section having upper and lower sides and upper and lower corners and having arc-form portions located at said upper corners of said trapezoidal cross-section.

4. The pass-through fishing rod of claim 3 wherein said convex portion has arc-form portions located at said lower corners of said trapezoidal cross-section.

5. The pass-through fishing rod of claim 3 wherein said lower side of said trapezoidal cross-section of said convex portion has a width between 0.6 and 1.2 mm.

6. The pass-through fishing rod of claim 3 wherein said trapezoidal cross-section of said convex portion has a height between 0.2 and 0.6 mm.

7. The pass-through fishing rod of claim 1 wherein said convex portion of said tip section is formed on said inside wall surface of substantially the entire length of said fishing line passage of said tip section.

8. The pass-through fishing rod of claim 1 wherein said butt section comprises a base rod and an intermediate rod.

9. The pass-through fishing rod of claim 8 wherein said tip section is adapted to be accommodated within said intermediate rod and said intermediate rod is adapted to be accommodated within said base rod.

10. The pass-through fishing rod of claim 8 wherein said tip section, said intermediate rod and said base rod are sequentially connected by joints.

11. A pass-through fishing rod comprising:
   (a) a tip section having a tip-end portion, said tip section having an internal fishing line passage with an inside wall surface,
      said tip section comprising a convex portion for supporting a fishing line formed on said inside wall surface of at least said tip-end portion of said fishing line passage,
      wherein said convex portion is formed from a wrapped prepreg in which a plurality of reinforcing fibers are embedded, and
   (b) a butt section having an internal fishing line passage with a smooth inside wall surface.

12. The pass-through fishing rod of claim 11 wherein said butt section is formed from a fiber-reinforced resin comprising reinforcing fibers.

13. The pass-through fishing rod of claim 12 wherein said butt section is formed from a plurality of layers of said fiber-reinforced resin, one of which forms said inside wall surface.

14. The pass-through fishing rod of claim 13 wherein said reinforcing fibers in said layer forming said inside wall surface are aligned in the circumferential direction.

15. The pass-through fishing rod of claim 11 wherein said convex portion is formed in a helical shape.

16. The pass-through fishing rod of claim 11 wherein said convex portion has a trapezoidal cross section, said trapezoidal cross-section having upper and lower sides and upper and lower corners and having arc-form portions located at said upper corners of said trapezoidal cross-section.

17. The pass-through fishing rod of claim 16 wherein said convex portion has arc-form portions located at said lower corners of said trapezoidal cross-section.

18. The pass-through fishing rod of claim 11 wherein said convex portion of said tip section is formed on said inside wall surface of substantially the entire length of said fishing line passage of said tip section.

19. The pass-through fishing rod of claim 11 wherein said butt section comprises a base rod and an intermediate rod.

* * * * *